W. S. C. MEGILL.
SPITTOON LIFTER.
APPLICATION FILED OCT. 18, 1910.

1,023,669.

Patented Apr. 16, 1912.

2 SHEETS—SHEET 1.

Fig. 1ª.

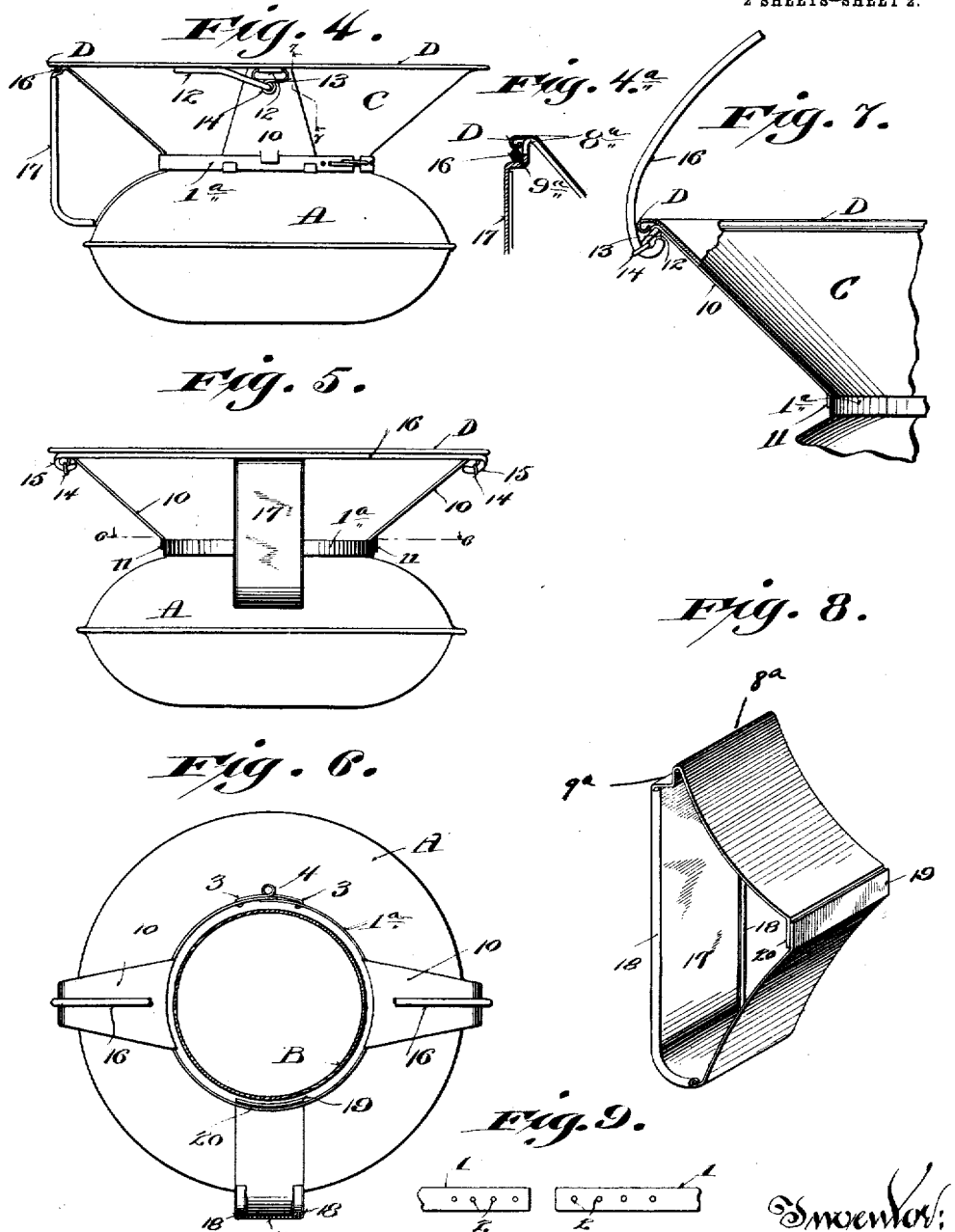

UNITED STATES PATENT OFFICE.

WILLIAM S. C. MEGILL, OF NATIONAL HOME, WISCONSIN.

SPITTOON-LIFTER.

1,023,669.  Specification of Letters Patent.  Patented Apr. 16, 1912.

Application filed October 18, 1910. Serial No. 587,781.

*To all whom it may concern:*

Be it known that I, WILLIAM S. C. MEGILL, a citizen of the United States, and resident of National Home, in the county of Milwaukee and State of Wisconsin, have invented certain new and useful Improvements in Spittoon-Lifters; and I do hereby declare that the following is a full, clear, and exact description thereof.

The primary object of my invention is to provide a simple, economical and effective handling apparatus for vessels such as cuspidors or similar handleless utensils, the construction and arrangement of the apparatus being such that a bail may be quickly and securely adjusted to a bell mouthed vessel and, when not in use, the bail is adapted to be turned down and concealed under the lipped edge of the vessel, being sprung to its seat thereunder and locked.

Another object of my invention is to provide a flexible open end band and means for adjustably securing the same to the waist of vessels varying in size, the band being adapted to clamp bail ears that are also adjustable as to position circumferentially of said vessel, which ears have upper edges that are interlocked with the circumferential lipped edges of the aforesaid vessel.

A further object of my invention is to provide a side handle for the vessel in connection with the flexible band, whereby said vessel may be conveniently and sanitarily handled when it is desired to move the same from place to place, it being understood that the bail is preferably used for carrying the vessel when filled, in which instance a series of such equipped vessels may be carried by suspending the same upon a pole or other suitable carrier.

With the above objects in view, my invention consists in what is herein shown, described and claimed with reference to the accompanying drawings.

Figure 1:
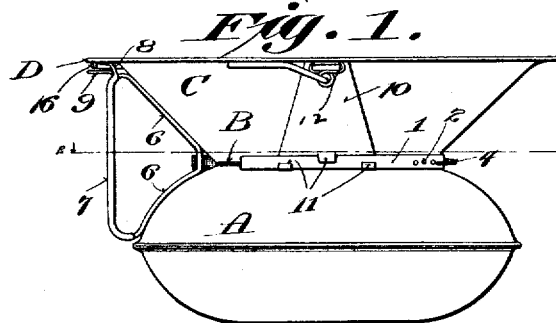
Figure 2:
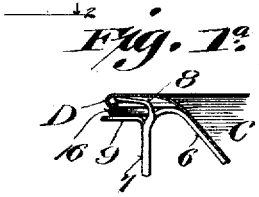
Figure 2:
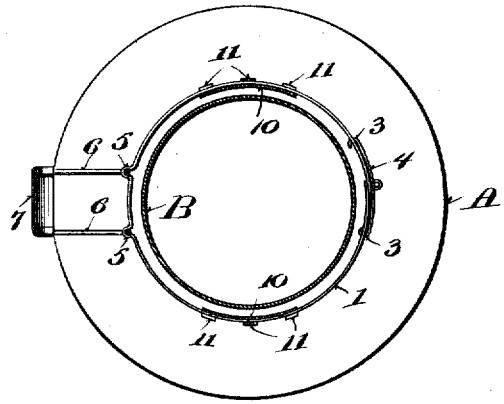
Figure 3:
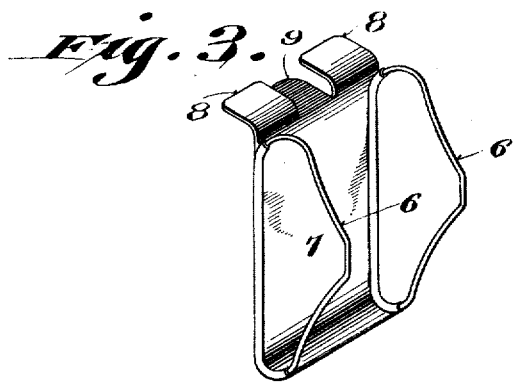

In the drawings Figure 1 represents a side elevation of a cuspidor equipped with a bail and side handle embodying the features of my invention, the cuspidor shown being of the standard type comprising a bell mouth and contracted waist line; Fig. 1ª, an enlarged detail cross-section illustrating a portion of the interlocked side handle in connection with the lipped edge of the cuspidor; Fig. 2, a sectional plan view of the same as indicated by line 2—2 of Fig. 1; Fig. 3, an enlarged perspective view of one form of side handle embodying the features of my invention; Fig. 4, a side elevation of a cuspidor equipped with a handling apparatus similar to that shown in Fig. 1, with the exception that the side handle in this instance is shown formed from a single piece of metal; Fig. 4ª, an enlarged detail sectional view illustrating the interlocking connection between the side handle and circumferential lipped mouth of the cuspidor; Fig. 5, an elevation of a cuspidor and the apparatus taken upon a view-point at a right angle to that of Fig. 4; Fig. 6, a plan sectional view of the same with the bail lifted to its working position, as indicated by line 6—6 of Fig. 5; Fig. 7, an enlarged fragmentary view, partly in section, illustrating the bail connection, the section being indicated by line 7—7 of Fig. 4; Fig. 8, an enlarged perspective view of that form of side handle illustrated in Fig. 4, the side handle being shown detached, and Fig. 9, an enlarged detail view of the flexible band ends.

Referring by character to the drawings, A represents the bowl portion, B the waist and C the bell mouth of a standard cuspidor, the bell mouth being provided with downturned lipped edges D.

Fitted about the waist line of the cuspidor is a flexible open end band 1, each of the ends being provided with a series of perforations 2 for the reception of hooked ends 3 of an expansible looped clip 4. By utilizing a fastening device of this character for the band ends, the said band may be adjusted to various sizes with their ends, in some instances, overlapped, as shown in Fig. 2, the expansible clip being capable of slight yield, whereby its hooked ends may be inserted within any one of the opposite series of apertures 2, it being understood that the loop in the clip will yield and also serve to draw the flexible band taut. The band, in this instance, is provided with offset notches 5, into which are seated a pair of endless looped wires 6, the wires being connected by a solid web-plate 7, which plate, together with the wire loops forms a side handle. The upper end of the plate is split and bent out to form a pair of gripping lips 8, the center portion thereof is slightly depressed to form a bail seat 9. The looped wires, when adjusted to the cuspidor, are shaped to conform to the walls thereof, while the web portion is provided for a grip, and, as best shown in Fig. 1ª, the gripping lips 8 are arranged to engage the downturned lipped edge D of the cuspidor mouth. Thus the handle is held rigid in its adjusted position.

A pair of ears 10 are slidably mounted upon the band 1, the same being held in position thereon by oppositely disposed tongues 11, which tongues extend from the base of the ears and engage the opposite edges of the band. The upper ends of the ears terminate in open beaded ends 12, as best shown in Fig. 7, which beaded ends are snugly fitted under the lipped edge D of the cuspidor, whereby they are held securely in place at this point. Depending links 13 are hinged within the open beaded ends of the ears, these links being provided with eyes 14 for the reception of hooked ends 15 of a bail 16.
The links thus form shackle connections between the ears and bail, and thereby render the ends of the bails capable of being sprung outwardly when the latter is lifted to its working position, as shown in Fig. 7. The bail, when not in use, is locked in the position shown in Fig. 1, being snapped over the lipped edge D of the cuspidor, under which edge it is concealed and securely held by means of the seat 9 that forms part of the side handle, it being apparent that the bail can readily be sprung over said lipped edge when it is desired to use the same, and, owing to its being securely locked, there is no liability for the same to drop out of position should the cuspidor be moved about, nor can said bail be seen by casual observation due to its concealment under the lip. The bail ears 10, as shown in each instance, are preferably adjustable about the band for the purpose of alining them upon opposite sides of the cuspidor to accommodate the apparatus to different sizes of the same.

The handling apparatus, as shown in Figs. 4 to 7 inclusive, is in every respect similar to that shown in Figs. 1 and 2, with the exception that, in the former instance, the side handle is formed from a single piece of metal comprising a gripping portion 17 having inturned beaded edges 18, whereby said gripping portion is strengthened and rendered smooth at its edges. The metal from the bottom of the gripping portion is bent obliquely thereto and terminates with a flat lip 19, which lip is adapted to fit under band 1ª. The upper portion of the gripping portion 17 of the side handle extends inwardly to form a bail seat 9ª and from thence upwardly to form an abrupt interlocking corner 8ª. From this corner the metal extends downwardly and terminates with a flanged end 20 that is also engaged by the band. By utilizing a handle of this form, it can be cheaply made from a single blank and, owing to its conformation with the walls of the cuspidor, it will be securely locked thereto by the flexible band and its interlocking connection 8ª, this side handle, together with the form of side handle shown in Fig. 1, being of a triangular looped construction.

While I have shown the ears 10 adjustable about the band, they may, in some instances, be secured thereto, and, if desired, that form of side handle just described, which is constructed from a single blank, may also be secured to the band by any suitable means.

Having described my invention in detail, particular attention is called to the arrangement whereby the bail may be concealed and a side handle secured to a vessel of this character.

The cuspidor may be provided with a permanent side handle.

I claim:—

1. A spittoon lifter, comprising a flexible open end adjustable band adapted to be fitted to the waist of the vessel, securing means for the band ends, pairs of bail ears carried by said band, eyed links in hinge connection with the upper ends of the ears, a bail having hook ends fitted within the link eyes, a triangularly shaped looped side handle in connection with the band, and a seat in the upper triangular corner of the side handle, in which seat the bail is adapted to rest when moved out of its working position.

2. In a beaded edge spittoon or the like, a flexible open end adjustable band fitted to the vessel's waist line, securing means for the band end, and a triangularly shaped looped side handle carried by the band having its upper corner interlocking the lipped edge of the vessel.

3. In a spittoon having a contracted waistline and bell-shaped mouth provided with a beaded terminal edge; the combination of a side handle conforming to the contour of the spittoon, a securing band for the side handle fitted to the waist-line of said spittoon, and engaging means extending from the side handle interlocked with the beaded terminal edge of the aforesaid spittoon.

In testimony that I claim the foregoing I have hereunto set my hand at Milwaukee in the county of Milwaukee and State of Wisconsin in the presence of two witnesses.

WILLIAM S. C. MEGILL.

Witnesses:
HENRY R. MARTIS,
N. E. OLIPHANT.

---

Copies of this patent may be obtained for five cents each, by addressing the "Commissioner of Patents. Washington. D. C."